(12) United States Patent
Ishii et al.

(10) Patent No.: US 7,970,403 B2
(45) Date of Patent: Jun. 28, 2011

(54) MOBILE STATION, MOBILE EXCHANGE STATION AND MOBILE COMMUNICATION METHOD

(75) Inventors: Minami Ishii, Yokohama (JP); Mikio Iwamura, Yokohama (JP); Katsutoshi Nishida, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 12/810,169

(22) PCT Filed: Mar. 26, 2009

(86) PCT No.: PCT/JP2009/056086
§ 371 (c)(1),
(2), (4) Date: Sep. 10, 2010

(87) PCT Pub. No.: WO2009/123005
PCT Pub. Date: Oct. 8, 2009

(65) Prior Publication Data
US 2010/0330982 A1    Dec. 30, 2010

(30) Foreign Application Priority Data
Apr. 3, 2008    (JP) .................................. 2008-097623

(51) Int. Cl.
*H04W 36/00* (2009.01)
(52) U.S. Cl. ........ 455/436; 455/437; 455/439; 455/440; 455/442

(58) Field of Classification Search .................. 455/436, 455/437, 439, 440, 442
See application file for complete search history.

(56) References Cited

U.S. PATENT DOCUMENTS
2008/0242292 A1 * 10/2008 Koskela et al. ............... 455/423

FOREIGN PATENT DOCUMENTS
JP    2007-89135 A    4/2007

OTHER PUBLICATIONS

Japanese Office Action mailed May 12, 2009; Reference No. 2008P00029, Japanese Patent Application Serial No. 2008-097623 with English translation (7 pages).

(Continued)

*Primary Examiner* — Marisol Figueroa
(74) *Attorney, Agent, or Firm* — Osha • Liang LLP

(57) ABSTRACT

A mobile station includes a cell selector unit for performing a cell reselection procedure for a predetermined period after a failure of detection of a radio link with a first radio base station which manages a first cell, a connection re-establishment request signal transmitter unit for transmitting a connection re-establishment request signal to a second radio base station managing a selected second cell, when it is determined that the second cell is a cell using a same radio access scheme as that of the first cell, and a connection recovery procedure starter unit for starting a connection recovery procedure for a mobile exchange station managing the second radio base station, when it is determined that a response signal received from the second base station in response to the connection re-establishment request signal indicates rejection of connection re-establishment.

9 Claims, 3 Drawing Sheets

OTHER PUBLICATIONS

3GPP TS 36.300 v8.3.0, Dec. 2007; Evolved Universal Terrestrial Radio Access (E-UTRA) and Evolved Universal Terrestrial Radio Access Network (E-UTRAN), 121 pages.

Kanamoto et al., "Tanmatsu Idoji ni Okeru Packet Loss-less Handover no Teian" (English title: "A proposal of a packet loss-less handover when a terminal moves,") Information Processing Society of Japan, Kenkyu Hokoku 2008-MLB-44 (14), Feb. 27, 2008, 11 pages.

International Search Report issued in PCT/JP2009/056086, mailed on Apr. 28, 2009, with translation, 4 pages.

Written Opinion issued in PCT/JP2009/056086, mailed on Apr. 28, 2009, 5 pages.

* cited by examiner

| # | Permanent ID | Temporal ID | MOBILE STATION STATE | PROVIDED SERVICE |
|---|---|---|---|---|
| 1 | AAAAA | BBBBB | IDLE | — |
| 2 | CCCCC | DDDDD | CONNECTED | VOICE |
| 3 | EEEEE | FFFFF | CONNECTED | PACKET |
| | ..... | ..... | ..... | ..... |

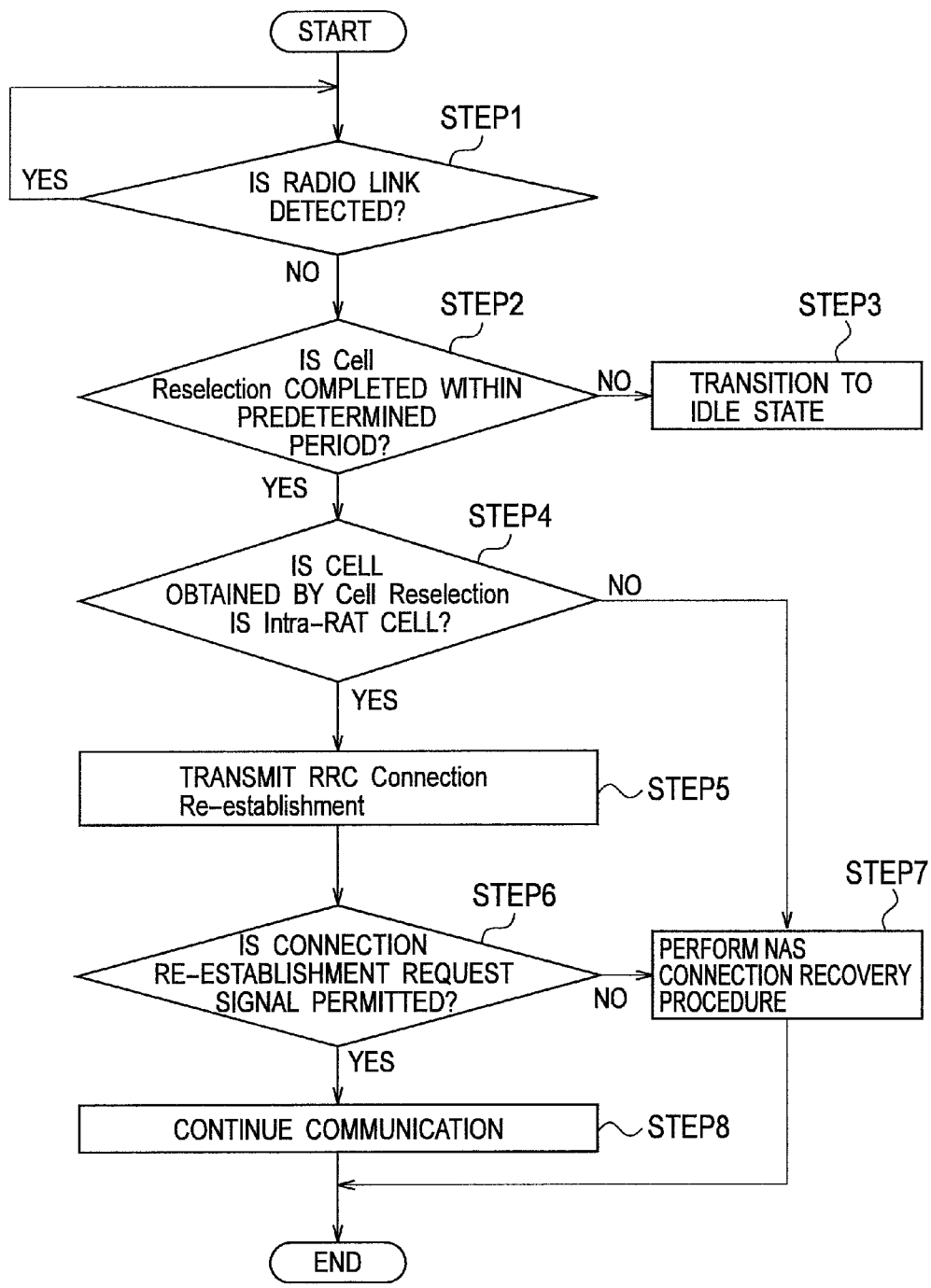

MOBILE STATION, MOBILE EXCHANGE STATION AND MOBILE COMMUNICATION METHOD

TECHNICAL FIELD

The present invention relates to a mobile communication method by which communication is performed between a mobile station and a mobile exchange station via a radio base station, and relates to the mobile station and the mobile exchange station.

BACKGROUND ART

In a mobile communication system having been studied as "Evolved universal terrestrial radio access network (E-UTRAN)", a mobile station is configured as follows. In a case where, in communicating in a certain cell, a mobile station reselects a cell satisfying a required quality (Cell Reselection) within a predetermined period after failing in detection of a radio link with a radio base station which manages the certain cell (Radio Link Failure), the mobile station transmits a connection re-establishment request signal to a radio base station which manages the cell reselected by the mobile station.

The aforementioned mobile communication system, however, has the following problems.

When holding setting information (UE Context) related to the mobile station, the radio base station having received the connection re-establishment request signal transmitted by the mobile station as described above continues the communication currently performed by the mobile station, in response to the connection re-establishment request signal. On the other hand, the radio base station rejects the connection re-establishment request signal, when not holding the setting information (UE Context) related to the mobile station.

In addition, when it is determined that only a cell (Inter-RAT cell) using a radio access scheme different from that of the certain cell has been reselected within the predetermined period after the occurrence of the foregoing "Radio Link Failure", the setting information (UE Context) related to the mobile station is not held in the "Inter-RAT cell". Therefore, the mobile station is configured to delete the setting information (UE Context) related to the mobile station.

Consequently, as described above, when the mobile station transmits the connection re-establishment request signal to the radio base station not holding the setting information (UE Context) related to the mobile station, the radio base station rejects the connection re-establishment request signal. Accordingly, a radio connection for communication performed by the mobile station is disconnected, and a user himself/herself needs to perform a connection recovery procedure manually, resulting in a problem of deteriorating serviceability.

Moreover, similarly, when only an "Inter-RAT cell" has been reselected within the predetermined period after the occurrence of the "Radio Link Failure", a user himself/herself needs to perform the connection recovery procedure manually, resulting in the problem of deteriorating serviceability.

DISCLOSURE OF THE INVENTION

The present invention has therefore been made in consideration of the foregoing problems and an object of the present invention is to provide a mobile station, a mobile exchange station and a mobile communication method which make it possible for a mobile station to automatically perform a connection recovery procedure without a user himself/herself performing the connection recovery procedure manually, even in a case where setting information (UE Context) related to the mobile station is not held in a cell reselected after "Radio Link Failure" is detected while the mobile station performs communication in a certain cell.

A first aspect of the present invention is summarized as a mobile station performing communication with a mobile exchange station via a radio base station, the mobile station including: a cell selector unit configured to perform a cell reselection procedure for a predetermined period after a failure of a detection of a radio link with a first radio base station which manages a first cell; a connection re-establishment request signal transmitter unit configured to transmit a connection re-establishment request signal to a second radio base station managing a second cell selected by the cell selector unit, when it is determined that the second cell is a cell using the same radio access scheme as that of the first cell; and a connection recovery procedure starter unit configured to start a connection recovery procedure for a mobile exchange station managing the second radio base station, when it is determined that a response signal received from the second radio base station in response to the connection re-establishment request signal is a signal indicating rejection of connection re-establishment, or when it is determined that the second cell is a cell using a different radio access scheme from that of the first cell.

In the first aspect, the connection recovery procedure starter unit can be configured to start the connection recovery procedure for the mobile exchange station, by transmitting, to the mobile exchange station, a signal including an identifier indicating a connection recovery procedure.

In the first aspect, the connection recovery procedure starter unit can be configured to start the connection recovery procedure for the mobile exchange station, by transmitting, to the mobile exchange station, at least one of a service request signal and a mobility management area update signal.

In the first aspect, the cell selector unit can be configured to perform a cell re-selection procedure, prioritizing a cell using the same radio access scheme and the same frequency as those of the first cell, a cell using the same radio access scheme as that of the first cell and a different frequency from that of the first cell and a cell using a different radio access scheme from that of the first cell, in this order.

A second aspect of the present invention is summarized as a mobile exchange station performing communication with a mobile station via a radio base station, the mobile exchange station including: a connection recovery signal determination unit configured to determine whether or not a first signal is a signal for connection recovery procedure upon receipt of the first signal from the mobile station; and a setting information update unit configured to delete old setting information related to the mobile station, and to then newly set up new setting information related to the mobile station, when the connection recovery signal determination unit determines that the first signal is the signal for connection recovery procedure.

In the second aspect, the connection recovery signal determination unit can be configured to determine whether or not the received first signal is the signal for connection recovery procedure on the basis of at least one of an information element included in the received first signal and the communication state of the mobile station.

In the second aspect, the setting information update unit can be configured to delete the old setting information in a different device from the mobile exchange station, and to set up the new setting information in the mobile exchange station, when the old setting information is managed by the different device.

A third aspect of the present invention is summarized as a mobile communication method for performing communication between a mobile station and a mobile exchange station via a radio base station, the method including the steps: performing, at the mobile station, a cell reselection procedure for a predetermined period after a failure of a detection of a radio link with a first radio base station which manages a first cell; transmitting, at the mobile station, a connection re-establishment request signal to a second radio base station managing a reselected second cell, when it is determined that the second cell is a cell using the same radio access scheme as that of the first cell; starting, at the mobile station, a connection recovery procedure for a mobile exchange station managing the second radio base station, when it is determined that a response signal received from the second radio base station in response to the connection re-establishment request signal is a signal indicating rejection of connection re-establishment, or when it is determined that the second cell is a cell using a different radio access scheme from that of the first cell; determining, at the mobile exchange station, whether or not a first signal is a signal for connection recovery procedure upon receipt of the first signal from the mobile station; deleting, at the mobile exchange station, old setting information related to the mobile station, and newly setting up new setting information related to the mobile station, when it is determined that the first signal is the signal for connection recovery procedure.

BRIEF DESCRIPTION OF THE DRAWINGS

FIG. 5 is a flowchart showing an operation of the mobile station according to the first embodiment of the present invention.

BEST MODE FOR CARRYING OUT THE INVENTION

Figure 1:
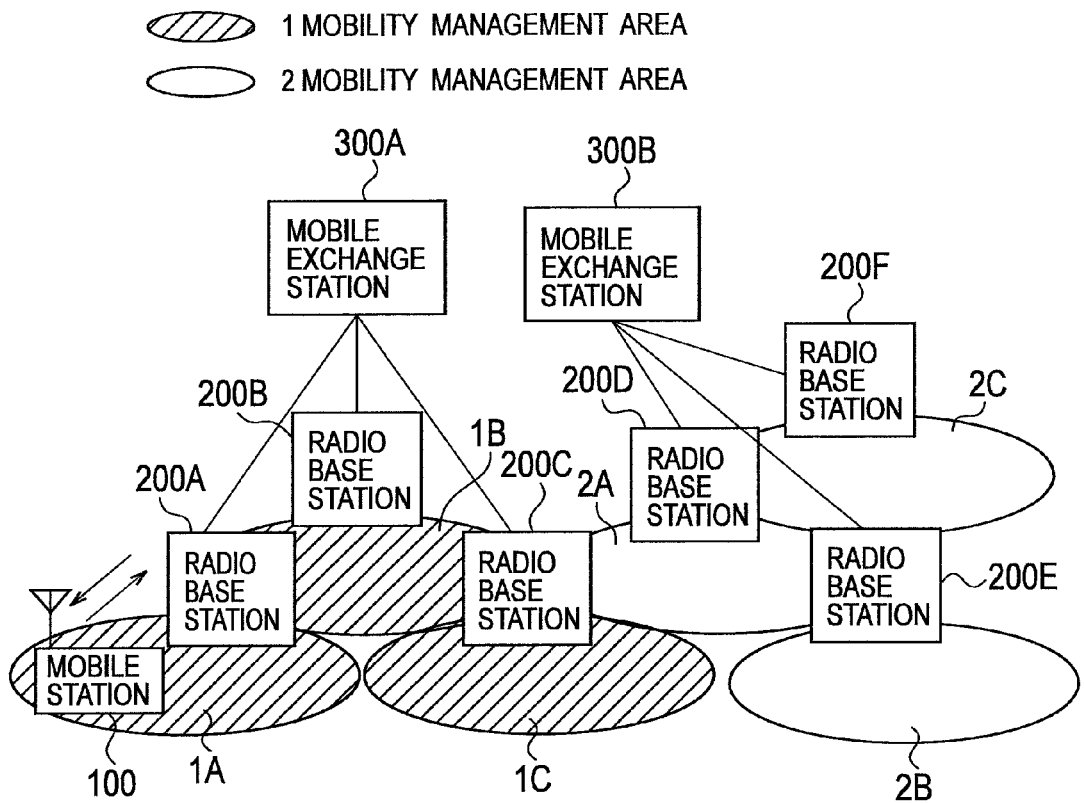
FIG. 1 is an overall configuration diagram of a mobile communication system according to a first embodiment of the present invention.

Configuration of Mobile Communication System According to First Embodiment of Present Invention A configuration of a mobile communication system according to a first embodiment of the present invention will be described with reference to FIG. 1 to FIG. 4. Note that components having the same function are denoted by the same reference numeral in all the drawings for explaining this embodiment, and a repeated description will be omitted.

As shown in FIG. 1, the mobile communication system according to this embodiment includes a mobile station 100, multiple radio base stations 200A to 200F and mobile exchange stations 300A and 300B.

Here, the mobile exchange station 300A is configured to manage a mobility management area 1 formed by an area (cell or sector) 1A managed by the radio base station 200A, an area (cell or sector) 1B managed by the radio base station 200B and an area (cell or sector) 1C managed by the radio base station 200C.

In addition, the mobile exchange station 300B is configured to manage a mobility management area 2 formed by an area (cell or sector) 2A managed by the radio base station 200D, an area (cell or sector) 2B managed by the radio base station 200E and an area (cell or sector) 2C managed by the radio base station 200F.

The mobile exchange station 300A is configured to communicate with a mobile station 100 existing in the mobility management area 1 (second mobility management area) via a corresponding one of the radio base stations 200A to 200C.

Meanwhile, the mobile exchange station 300B is configured to communicate with a mobile station 100 existing in the mobility management area 2 (first mobility management area) via a corresponding one of the radio base stations 200D to 200E.

Basically having the same configuration, the mobile exchange station 300A and the mobile exchange station 300B are collectively referred to as a mobile exchange station 300 below to describe the configuration thereof.

Figure 2:
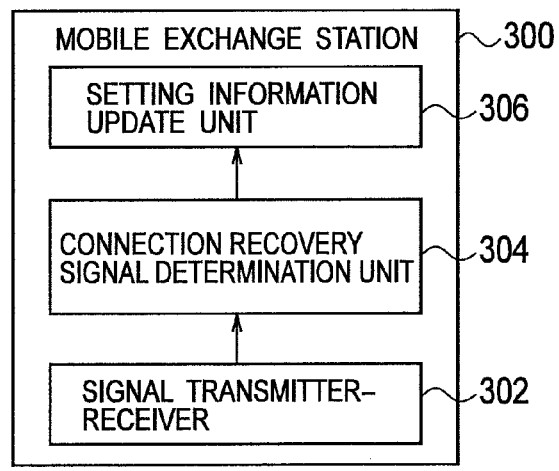
FIG. 2 is a functional block diagram of a mobile exchange station according to the first embodiment of the present invention.

As shown in FIG. 2, the mobile exchange station 300 includes a signal transmitter-receiver unit 302, a connection recovery signal determination unit 304 connected to the signal transmitter-receiver unit 302, and a setting information update unit 306 connected to the connection recovery signal determination unit 304.

The signal transmitter-receiver unit 302 is configured to transmit and receive signals between a mobile station and a radio base station.

The signal transmitter-receiver unit 302 is configured to receive, for example, a mobility management area update signal (Tracking Area Update) for reporting that the mobility management area of the mobile station changes and a service request signal (Service Request), from the mobile station.

The connection recovery signal determination unit 304 is configured to determine whether or not a first signal is a signal for connection recovery procedure upon receipt of the first signal from the mobile station.

Note that the first signal received from the mobile station may be a signal transmitted by the mobile station as a NAS signal, or a signal obtained by causing the radio base station to reconfigure a signal received from the mobile station as a signal addressed to the mobile exchange station.

The connection recovery signal determination unit 304 may be configured to determine whether or not the received first signal is the signal for connection recovery procedure on the basis of at least one of an information element included in the received first signal and the communication state of the mobile station.

The connection recovery signal determination unit 304 may be configured to use at least one of, for example, a starting cause (Establishment cause) and a connection recovery identifier, as the information element.

Figures 3, 4:
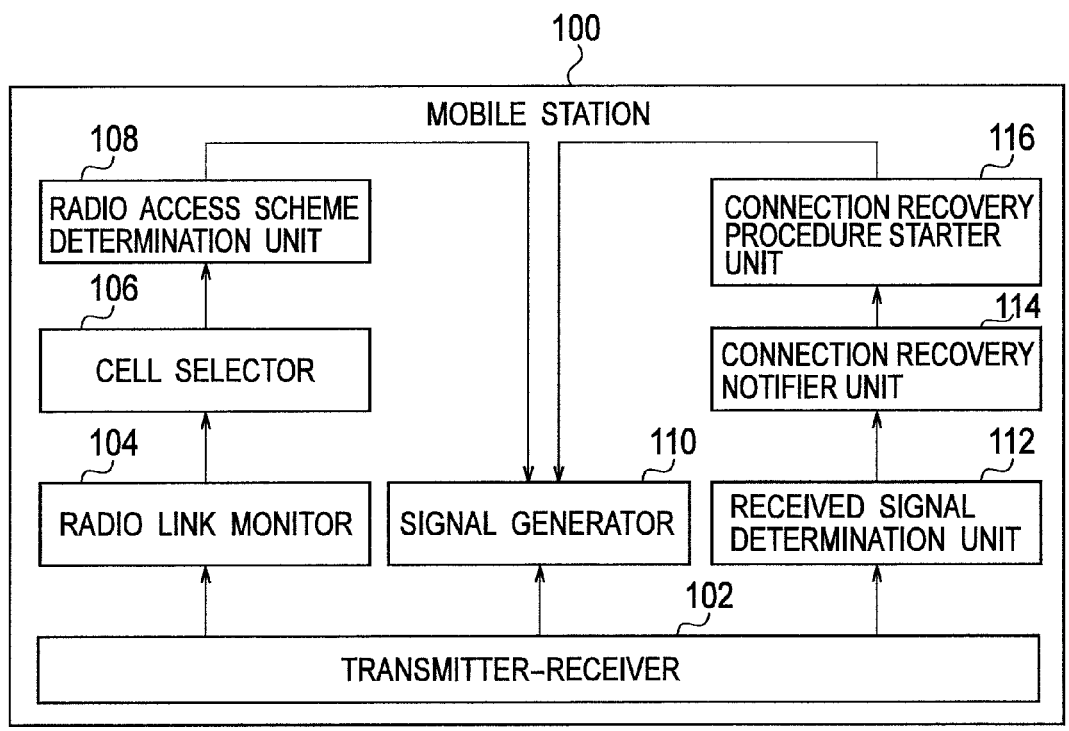
FIG. 3 is a mobile station management information table in the mobile exchange station according to the first embodiment of the present invention.
FIG. 4 is a functional block diagram of a mobile station according to the first embodiment of the present invention.

Alternatively, the connection recovery signal determination unit 304 may manage mobile station information in which "Permanent ID", "Terminal ID", "mobile station state" and "provided service" are associated with one another as shown in FIG. 3. As the communication state of the mobile station, when the "mobile station state" of the mobile station is "connected", the connection recovery signal determination unit 304 may determine that the received first signal is the signal for connection recovery procedure. On the other hand, when the "mobile station state" of the mobile station is "idle", the connection recovery signal determination unit 304 may determine that the received first signal is a signal for initial starting.

The setting information update unit 306 is configured to delete old setting information related to the mobile station and to newly set up setting information related to the mobile station, when the connection recovery signal determination unit 304 determines that the first signal is the signal for connection recovery procedure. However, when the old setting information is the same as the new setting information, the old setting information may be used without being deleted.

For example, suppose a case where the old setting information (UE Context) related to the mobile station has been managed by the mobile exchange station 300A, and the mobile station moves to a mobility management area of the mobile exchange station 300B and transmits a mobility management area update signal to the mobile exchange station 300B. In such a case, the mobile exchange station 300B may be configured to communicate with the mobile exchange station 300A, to delete the old setting information (UE Context) which is in the mobile exchange station 300A (different device) and related to the mobile station, and to set up new setting information (UE Context) related to the mobile station in the mobile exchange station 300B.

As shown in FIG. 4, the mobile station 100 includes a transmitter-receiver unit 102, a radio link monitor unit 104 connected to the transmitter-receiver unit 102, a cell selector unit 106 connected to the radio link monitor unit 104, a radio access scheme determination unit 108 connected to the cell selector unit 106, a signal generator unit 110 connected to the radio access scheme determination unit 108, a received signal determination unit 112 connected to the transmitter-receiver unit 102, a connection recovery notifier unit 114 connected to the received signal determination unit 112, and a connection recovery procedure starter unit 116 connected to the connection recovery notifier unit 114.

The transmitter-receiver unit 102 is configured to receive a synchronization signal for cells, a reference signal, broadcast information (System Information), a signal from a radio base station, a signal from a mobile exchange station, and the like, and to transmit a signal addressed to a radio base station and a signal addressed to a radio exchange station.

For example, the signal from a radio base station or the signal addressed to a radio base station may be an RRC (Radio Resource Control) signal, and the signal from a mobile exchange station or the signal addressed to a mobile exchange station may be a NAS signal.

Note that the transmitter-receiver unit 102 is configured to transmit a signal generated by the signal generator unit 110.

The radio link monitor unit 104 is configured to monitor a radio link established for communication with a first radio base station which manages a first cell.

The cell selector unit 106 is configured to perform cell reselection procedure for a predetermined period after a failure of a detection of the radio link with the first radio base station which manages the first cell.

Note that the predetermined period may be set as a time period for which the cell selection procedure is to be performed by the time the mobile station 100 transitions from the connected state (RRC_Connected state) to the idle state (RRC_Idle state).

For example, the cell selector unit 106 may be configured to perform the cell reselection processing, prioritizing a cell using the same radio access scheme and the same frequency as those of the first cell, a cell using the same radio access scheme as that of the first cell and a different frequency from that of the first cell, and a cell using a different radio access scheme from that of the first cell (Inter-RAT cell) in this order.

The radio access scheme determination unit 108 is configured to determine whether or not a second cell which the cell selector unit 106 has reselected (Cell Reselection) is a cell using the same radio access scheme as that of the first cell.

For example, the radio access scheme determination unit 108 may be configured to determine which one of "GSM scheme", "UMTS scheme", "LTE (FDD) scheme" and "LTE (TDD) scheme" is employed in each of the first cell and the second cell as the radio access scheme.

The signal generator unit 110 is configured to generate a signal addressed to a radio base station and a signal addressed to a mobile exchange station.

The signal generator unit 110 is configured to generate a connection re-establishment request signal (RRC Connection Re-establishment), when the radio access scheme determination unit 108 determines that the second cell which the cell selector unit 106 has reselected is a cell using the same radio access scheme as that of the first cell, for example.

Moreover, the signal generator unit 110 is configured to generate at least one of a NAS service request signal (Service Request) and a mobility management area update signal (Tracking Area Update), when the connection recovery procedure has been activated by the connection recovery procedure starter unit 116, for example.

Here, the signal generator unit 110 may be configured to insert an identifier indicating the connection recovery procedure into the generated NAS signal as a part thereof.

For example, the identifier indicating the connection recovery may be configured to be inserted as a part of a signal transmission cause (Establishment Cause), or may be configured to be inserted as a connection recovery identifier.

The received signal determination unit 112 is configured to analyze a signal received by the transmitter-receiver unit 102.

The received signal determination unit 112 is configured to notify, to the connection recovery notifier unit 114, the necessity of the connection recovery procedure, when the received signal determination unit 112 determines that the signal received by the transmitter-receiver unit 102 (a response signal received from a second radio base station in response to the reselection request signal) is a signal indicating rejection of the connection re-establishment (RRC Connection Re-establishment Reject).

The connection recovery notifier unit 114 is configured to instruct the connection recovery procedure starter unit 116 to perform the NAS connection recovery procedure, when the radio access scheme determination unit 108 determines that the reselected second cell is a cell using a different radio access scheme from that of the first cell.

The connection recovery procedure starter unit 116 is configured to start the NAS connection recovery procedure in accordance with the instruction from the connection recovery notifier unit 114.

Operation of Mobile Communication System
According to First Embodiment of Present Invention An operation of the mobile station according to the first embodiment of the present invention will be described with reference to FIG. 5.

As shown in FIG. 5, in Step 1, the mobile station 100 determines whether a radio link established for communication with the first radio base station which manages the first cell has been successfully detected.

In a case where the detection of the radio link has failed, in Step 2, the mobile station 100 determines whether or not the cell reselection processing (Cell Reselection) has been completed within the predetermined period.

When it is determined that the cell reselection processing has not been completed, in Step 3, the mobile station 100 transitions to an idle state.

On the other hand, when it is determined that the cell reselection processing has been completed, in Step 4, the mobile station 100 determines whether or not the reselected second cell is a cell using the same radio access scheme as that of the first cell (Intra-RAT cell).

When it is determined that the cell is an Intra-RAT cell, in Step 5, the mobile station 100 transmits a connection re-establishment request signal (RRC Connection Re-establishment) to the second radio base station which manages the second cell.

In Step 6, the mobile station 100 determines whether or not a response signal from the second radio base station in response to the aforementioned connection re-establishment request signal represents a permission of the connection re-establishment.

When it is determined that the cell is not an Intra-RAT cell (is an Inter-RAT cell) in Step 4, or when it is determined that the connection re-establishment is not permitted in Step 6, in Step 7, the NAS connection recovery procedure is started.

On the other hand, when it is determined that the connection re-establishment is permitted in Step 6, in Step 8, communication performed by the mobile station 100 is continued.

Advantageous Effect of Mobile Communication System According to First Embodiment of Present Invention The mobile communication system according to the first embodiment of the present invention makes it possible for the mobile station 100 to automatically perform a connection recovery procedure without the user himself/herself performing the connection recovery procedure manually, even in a case where setting information (UE Context) related to the mobile station 100 is not held in a second cell reselected after "Radio Link Failure" is detected while the mobile station 100 performs communication in a first cell.

(Modification)

Note that the above-described operations of the mobile station and mobile exchange station may be implemented by hardware, software modules executed by a processor, or a combination of the hardware and the software modules.

Each software module may be provided in a storage medium of any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to a processor so that the processor can read or write information from or into the storage medium. Alternatively, the storage medium may be integrated in a processor. Further, the storage medium and the processor may be provided in an ASIC, and the ASIC may be provided in the mobile station and the mobile exchange station. Alternatively, the storage medium and the processor may be provided as discrete components in the mobile station and the mobile exchange station.

While the present invention has been described in detail above by using the foregoing embodiment, it is apparent to those skilled in the art that the present invention is not limited to the embodiment described herein. The present invention may be practiced in the form of modifications and variations without departing from the gist and scope of the present invention as defined in the description of the scope of claims. It is to be therefore understood that the description herein is for the purpose of illustration only and is not intended to limit the present invention.

INDUSTRIAL APPLICABILITY

As described above, the present invention can provide a mobile station, a mobile exchange station and a mobile communication method which make it possible for a mobile station to automatically perform a connection recovery procedure without the user himself/herself performing the connection recovery procedure manually, even in a case where setting information (UE Context) related to the mobile station is not held in a cell reselected after "Radio Link Failure" is detected while the mobile station performs communication in a certain cell.

The invention claimed is:

1. A mobile station comprising:
   a cell selector unit configured to select a cell satisfying a predetermined communication quality, as a connection re-establishment target cell, from among a plurality of cells including a connection source cell managed by a connection radio base station to which the mobile station is communicating, after a failure of a detection of a radio link with the connection radio base station; and
   a transmitter unit configured to transmit a connection re-establishment request signal to a connection re-establishment target candidate radio base station managing the connection re-establishment target cell, when the connection re-establishment target cell selected by the cell selector unit is a cell using the same radio access scheme as that of the connection source cell, wherein
   the transmitter unit is configured to notify, to a mobile exchange station managing the connection re-establishment target candidate radio base station, information on the mobile station via the connection re-establishment target candidate radio base station, and to cause the mobile exchange station to start a connection recovery procedure for starting communication between the mobile station and the connection re-establishment target candidate radio base station, when a notification of rejection of connection re-establishment is made by the connection re-establishment target candidate radio base station as a response signal in response to the connection re-establishment request signal transmitted from the transmitter unit, or when the connection re-establishment target cell is a cell using a radio access scheme different from that of the connection source cell.

2. The mobile station according to claim 1, wherein the information on the mobile station includes an identifier indicating a connection recovery procedure.

3. The mobile station according to claim 1, wherein the transmitter unit is configured to transmit at least one of a service request signal and a mobility management area update signal as the information on the mobile station, to the mobile exchange station.

4. The mobile station according to claim 1, wherein the cell selector unit is configured to select the connection re-establishment target cell, by prioritizing a cell using the same radio access scheme and the same frequency as those of the connection source cell, a cell using the same radio access scheme as that of the connection source cell and a different frequency from that of the connection source cell and a cell using a different radio access scheme from that of the connection source cell, in this order.

5. The mobile station according to claim 2, wherein the transmitter unit is configured to transmit at least one of a service request signal and a mobility management area update signal as the information on the mobile station, to the mobile exchange station.

6. The mobile station according to claim 2, wherein the cell selector unit is configured to select the connection re-establishment target cell, by prioritizing a cell using the same radio access scheme and the same frequency as those of the connection source cell, a cell using the same radio access scheme as that of the connection source cell and a different frequency from that of the connection source cell and a cell using a different radio access scheme from that of the connection source cell, in this order.

7. The mobile station according to claim 3, wherein the cell selector unit is configured to select the connection re-establishment target cell, by prioritizing a cell using the same radio access scheme and the same frequency as those of the connection source cell, a cell using the same radio access scheme as that of the connection source cell and a different frequency from that of the connection source cell and a cell using a different radio access scheme from that of the connection source cell, in this order.

8. The mobile station according to claim 5, wherein the cell selector unit is configured to select the connection re-establishment target cell, by prioritizing a cell using the same radio access scheme and the same frequency as those of the connection source cell, a cell using the same radio access scheme as that of the connection source cell and a different frequency from that of the connection source cell and a cell using a different radio access scheme from that of the connection source cell, in this order.

9. A mobile communication method comprising the steps:
(A) selecting a cell satisfying a predetermined communication quality, as a connection re-establishment target cell, from among a plurality of cells including a connection source cell managed by a connection radio base station to which the mobile station is communicating, after a failure of a detection of a radio link with the connection radio base station;
(B) transmitting a connection re-establishment request signal to a connection re-establishment target candidate radio base station managing the connection re-establishment target cell, when the connection re-establishment target cell selected in the step (A) is a cell using the same radio access scheme as that of the connection source cell; and
(C) notifying, to a mobile exchange station managing the connection re-establishment target candidate radio base station, information on the mobile station via the connection re-establishment target candidate radio base station, and causing the mobile exchange station to start a connection recovery procedure for starting communication between a mobile station and the connection re-establishment target candidate radio base station, when a notification of rejection of connection re-establishment is made by the connection re-establishment target candidate radio base station as a response signal in response to the connection re-establishment request signal transmitted in the step (B), or when the connection re-establishment target cell is a cell using a radio access scheme different from that of the connection source cell.

* * * * *